Jan. 10, 1950     C. I. CEDERHOLM     2,494,228
VALVE CONSTRUCTION
Filed Nov. 8, 1945
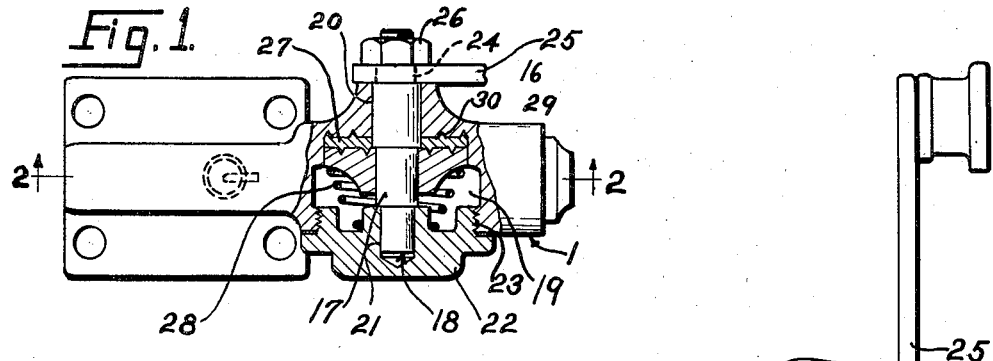
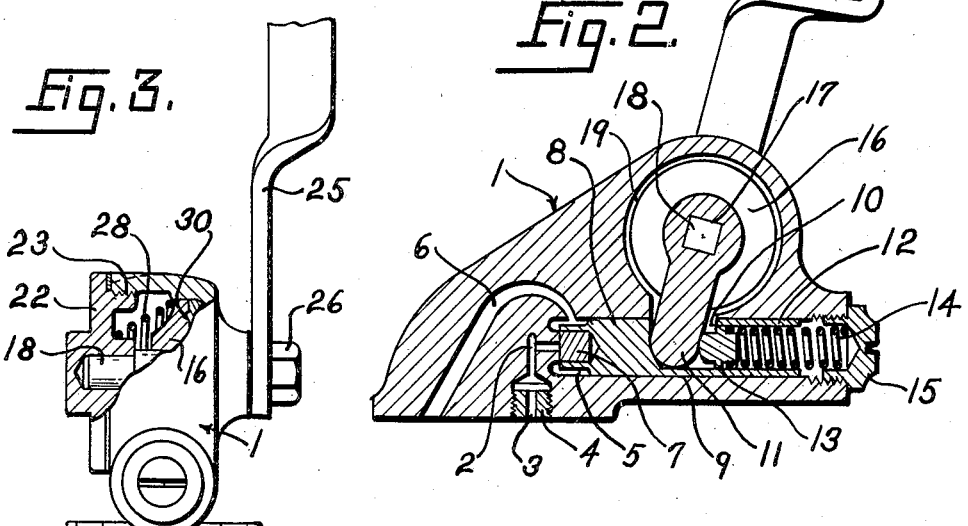
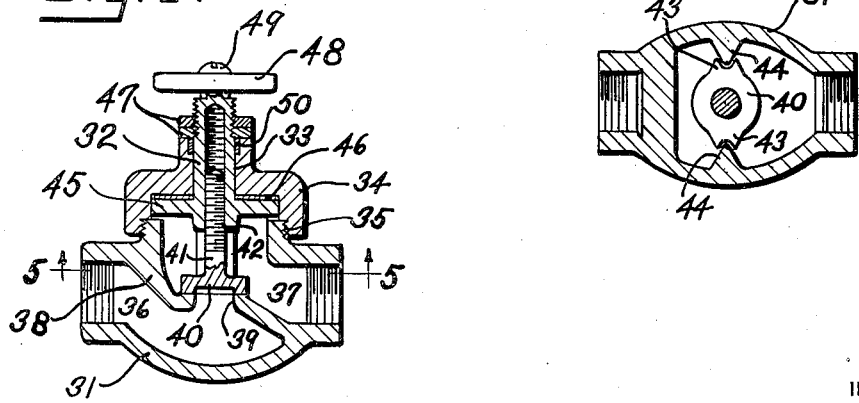
INVENTOR
CARL INGVE CEDERHOLM
BY Chapin & Neal
ATTORNEYS Patented Jan. 10, 1950

2,494,228

UNITED STATES PATENT OFFICE 2,494,228

VALVE CONSTRUCTION

Carl Ingve Cederholm, South Worthington, Mass.

Application November 8, 1945, Serial No. 627,436

2 Claims. (Cl. 251—132)

This invention relates to an improvement in valves and more particularly to valves intended for the control of fluids under pressure.

The principal object of my invention is to provide means for preventing leakage of the fluid from the valve chambers through the opening or openings in the valve body through which the valve operating means extends.

A further object is to provide means of the above character in which the fluid pressure in the valve body increases the sealing efficiency of the parts.

Other and further objects residing in the details of construction and the relative arrangement of the parts will be made apparent from the following specification and claims.

In the accompanying drawings which illustrate two embodiments of the invention,

Fig. 1 is a plan view of a valve embodying my invention, parts being broken away;

Fig. 2 is a sectional view substantially on line 2—2 of Fig. 1;

Fig. 3 is an end elevational view looking from the right of Fig. 1, parts being broken away;

Fig. 4 is a sectional view showing the invention applied to a different form of valve; and Fig. 5 is a sectional view substantially on line 5—5 of Fig. 4.

In the drawings, Figs. 1, 2 and 3 show a valve particularly adapted to control the flow of steam under pressure to the large pressing irons and similar devices used in the garment trade. In valves hitherto used for such purposes substantial difficulty has been experienced from the leakage of steam from the valve body or casing. The condensate from the escaped steam coming in contact with the garment materials causes spotting and substantial loss. Losses from this source have at best only been reduced by constant renewal of the valve packings, and parts, at substantial expense and loss of time. These difficulties are overcome in the valve shown in Figs. 1, 2 and 3. Referring to these figures 1 designates the body or casing of the valve, which is formed with a steam inlet duct or port 2 aligned with port 3 formed in a plug 4 threaded into the casing. Port 2 opens to a chamber 5 in the valve body from which chamber outlet port 6 opens to the outside of the casing for connection to the steam chamber of the iron or other device controlled by the valve. The inner end of port 2 is adapted to be closed by valve plug 7 set in the end of cylindrical valve member 8 slidably mounted in a cylindrical portion 9 of chamber 5. Intermediate its ends member 8 is cut away as at 10 to receive the end of an operating arm 11 later described. Rearwardly of arm 11 member 8 is bored as at 12 to receive a plunger 13. A spring 14, compressed between the plunger 13 and a plug 15 threaded into the casing at the end of cylindrical portion 9, normally holds member 8 in valve closing position as shown in Fig. 2.

Arm 11 is formed integral with a flange member 16 press fitted on a squared intermediate portion 17 of an operating shaft generally indicated at 18. Shaft 18 extends transversely of a portion 19 of the valve chamber above valve member 8. One end of shaft 18 extends outwardly of the casing through a bearing opening 20, the other end of the shaft turning in a bearing 21 formed in a cap member 22 threaded into the casing as at 23. Outwardly of the casing shaft 18 is squared as at 24 to receive an operating handle 25 held in place by a nut 26.

The flange member 16 is of substantial diameter and between member 16 and the wall of the casing through which operating shaft 18 extends I position a flat annular pressure sealing member 27 having a diameter substantially equal to the diameter of flange 16. This sealing member is formed of a heat resisting plastic or of any conventional or suitable pressure sealing composition. A spring 28 compressed between cap 22 and flange 16 applies a sealing pressure to member 27. The inner surface of flange 16 is exposed to the steam pressure built up in chamber 19 by steam passing around valve member 8 and this pressure acting on the substantial area of flange 16 serves to further compress the sealing member 27 with the result that no steam can escape outwardly of the casing along the operating shaft 18. As the steam pressure increases the tightness of the seal against the escape of steam increases. This arrangement is far more efficient and reliable than the gland and stuffing box type of seal heretofore used and overcomes the long existing difficulties experienced in the garment trade, and meets similar exacting requirements for assurance against leakage in other valve uses.

Preferably but not necessarily the faces of member 27 are formed with annular triangular shaped ridges 29 which ride in similar shaped grooves 30 formed in the adjacent faces of the wall of the valve casing and member 16.

With the parts in the position shown in Fig. 2 member 8 is held in valve closing position by spring 14. Movement of operating handle 25 to impart counterclockwise rotation to shaft 18, as viewed in Fig. 2, causes arm 11 to compress spring 14 permitting the fluid pressure in duct 2 to move member 8 rearwardly to open the valve. If for any reason the fluid pressure is insufficient to unseat member 8 continued movement of arm 11 brings the latter into engagement with the edge of cut 10 to move member 8 away from its seat. Upon release of handle 25, spring 14 returns member 8 to valve closing position.

In Figs. 4 and 5 my invention is shown applied to a globe valve. In the latter figures the valve housing is shown at 31. An operating shaft 32 extends into the housing through a bearing opening 33 formed in a cap member 34 threaded to the housing at 35. The housing is divided into two chambers 36 and 37 by a wall member 38 having valve opening 39. Opening 39 is adapted to be closed by a valve member 40 carried by a stem 41 threaded at 42 into operating shaft 32. Valve member 40 is formed with grooved side lugs 43 (Fig. 5) which ride on ribs 44 extending from the walls of the housing and which prevent rotation of the valve member 40. Thus upon rotation of shaft 32 stem 41 is raised or lowered to open or close the valve. Operating shaft 32 is provided adjacent its inner end with a flange 45 of substantial diameter. A flat annular pressure sealing member 46, similar to member 27 previously described, is positioned between flange 45 and the adjacent wall of the housing cap 34. Flange 45 is adapted to be drawn toward the housing cap to apply pressure to the sealing member 46 by nuts 47 threaded on the outer end of shaft 32. The outer end of shaft 32 is provided with an operating hand wheel 48 held in place by a screw 49. If desired lubricating ring 50 may be provided around shaft 32.

The inner face of flange 45 is exposed to any fluid pressure in chamber 37 so that, as in the form previously described, the greater the fluid pressure in the chamber 37 the greater the pressure applied to sealing disc 46. Escape of fluid along operating shaft 32 is thereby prevented.

I claim:

1. Operating mechanism for a fluid pressure control valve which comprises a casing, a substantially cylindrical chamber formed in the casing, said chamber being open at one end, the inner wall of said chamber being formed with an axial opening, a valve operating shaft extending through said opening, said opening forming a bearing for said shaft, the inner wall of said chamber being recessed around said opening, a cap member threaded into and closing the open end of the chamber, a seat formed in the inner face of the cap member and providing a bearing for the inner end of said shaft, an annular flat sealing disc fitted in said recess, a flange fixed to said shaft and fitting in said recess with its outer face engaging said disc, the inner face of said flange being exposed to the fluid pressure in the casing to compress said sealing disc radially between the peripheral edge of said recess and the operating shaft as well as axially between the flange and the casing wall, an arm extending from said flange at right angles to said shaft, a valve actuating plunger reciprocably mounted in the casing for movement at right angles to the shaft, the free end of said arm making a lost motion engagement with said plunger, and spring actuated means engaging said arm adjacent its free end to normally maintain said arm in valve closing engagement with said plunger.

2. Operating mechanism for a fluid pressure control valve which comprises a casing, a substantially cylindrical chamber extending transversely of the casing, said chamber being open at one end, the inner wall of said chamber being formed with an axial opening, a valve operating shaft extending through said opening, a cap member threaded into and closing the open end of the chamber, the inner face of said cap member being formed with a seat providing a bearing for the inner end of said shaft, a flange fixed to the shaft within the casing, an annular sealing member surrounding the shaft between said flange and said opening, a spring compressed between the cap member and the flange, an arm extending from said flange at right angles to the shaft, a valve actuating plunger extending longitudinally of the casing at right angles to the shaft and slidably mounted in the casing, said plunger being formed with a recess in which the free end of said arm makes a lost motion engagement, a second plunger slidably mounted in said first plunger and engaging the free end of said arm within the recess, and a spring compressed between the last-named plunger and the casing to normally maintain said arm in valve closing engagement with the first-mentioned plunger.

CARL INGVE CEDERHOLM.

REFERENCES CITED

The following references are of record in the file of this patent:

UNITED STATES PATENTS

| Number | Name | Date |
| --- | --- | --- |
| 103,145 | Cooper | May 17, 1870 |
| 665,209 | Graber | Jan. 1, 1901 |
| 1,010,837 | Woodworth | Dec. 5, 1911 |
| 1,290,587 | Lane | Jan. 7, 1919 |
| 1,839,264 | Replogle | Jan. 5, 1932 |
| 2,324,150 | Groomes | July 13, 1943 |